(12) United States Patent
Klemer et al.

(10) Patent No.: US 8,203,588 B2
(45) Date of Patent: Jun. 19, 2012

(54) OBTAINING PRESSURE OF AN OPERATING ENVIRONMENT OF A BI-DIRECTIONALLY SCANNING ELECTROGRAPHIC DEVICE FOR IMPLEMENTING CORRECTIONS PER PRESSURE

(75) Inventors: Daniel R. Klemer, Lexington, KY (US); Craig P. Bush, Lexington, KY (US); Martin C. Klement, Lexington, KY (US); David J. Mickan, Lexington, KY (US); Wilson M. Routt, Jr., Lexington, KY (US); Eric W. Westerfield, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 12/858,574

(22) Filed: Aug. 18, 2010

(65) Prior Publication Data

US 2011/0064447 A1    Mar. 17, 2011

Related U.S. Application Data

(62) Division of application No. 11/513,951, filed on Aug. 31, 2006, now Pat. No. 7,800,640.

(51) Int. Cl.
*B41J 15/14* (2006.01)
*B41J 27/00* (2006.01)

(52) U.S. Cl. ......... 347/260; 347/241; 347/243; 347/256
(58) Field of Classification Search .................. None
See application file for complete search history.

(56) References Cited

U.S. PATENT DOCUMENTS

2003/0122066 A1* 7/2003 Dunfield ................. 250/235
2006/0028533 A1* 2/2006 Nakajima ................ 347/233

* cited by examiner

*Primary Examiner* — Matthew Luu
*Assistant Examiner* — Kendrick Liu

(57) ABSTRACT

Methods and apparatus include improving print quality of a bi-directionally scanning electrophotographic (EP) device, such as a laser printer or copy machine, according to ambient pressure in which operated. A moving galvanometer or oscillator reflects a laser beam to create scan lines of a latent image in opposite directions. A damping of the motion occurs per air density implicated by temperature and pressure, where the pressure changes occurring especially from altitude changes. During use, a drive signal, such as a pulse train, moves the galvanometer or oscillator at or near its resonant frequency. Based on a parameter of the drive signal, such as pulse width, the ambient pressure can be made known. In general, a high-pressure environment requires a relatively longer pulse width to resonate the galvanometer or oscillator in comparison to a shorter pulse width for a low-pressure environment. Corrections to print quality stem from the determined ambient pressure.

8 Claims, 15 Drawing Sheets

OBTAINING PRESSURE OF AN OPERATING ENVIRONMENT OF A BI-DIRECTIONALLY SCANNING ELECTROGRAPHIC DEVICE FOR IMPLEMENTING CORRECTIONS PER PRESSURE

CROSS REFERENCE TO RELATED APPLICATION

Pursuant to 37 C.F.R. §1.78, this application is a divisional and claims the benefit of the earlier filing date of application Ser. No. 11/513,951, filed Aug. 31, 2006, now U.S. Pat. No. 7,800,640 entitled "Obtaining Pressure of an Operating Environment of a Bidirectionally Scanning Electrophotographic Device for Implementing Corrections per Pressure."

FIELD OF THE INVENTION

Generally, the present invention relates to electrophotographic (EP) devices, such as laser printers or copy machines. Particularly, it relates to improving print quality in electrophotographic devices utilizing bidirectional scanning. In one aspect, EP devices are characterized according to pressure. In another, ambient operating conditions are obtained and corrections implemented. In still other aspects, pressure is obtained from understanding movement of structures in the EP device that are influenced by pressure.

BACKGROUND OF THE INVENTION

Traditional electrophotographic (EP) devices have a spinning polygon mirror that directs a laser beam to a photoconductor, such as a drum, to create one or more scan lines of a latent to-be-printed image. Recently, however, it has been suggested that torsion oscillator or resonant galvanometer structures can replace the traditional spinning polygon mirror and create scan lines in both the forward and reverse directions (e.g., bi-directionally), thereby increasing efficiency of the EP device. Because of their MEMS scale size and fabrication techniques, the structures are also fairly suggested to reduce the relative cost of manufacturing. Unfortunately, scanning in two directions adds a measure of complexity to image referencing since reference points need occur for each of the forward and reverse scans at opposite ends of the printed page and the slightest of deviations amplifies print image imperfections. Also, any asymmetry in the motion of the oscillator or galvanometer results in errors in print linearity and line-to-line registration across the printing area.

Under ideal conditions, the oscillator or galvanometer is well controlled by a drive configuration to move it sinusoidally without impedance. Because of modern design constraints, however, sinusoidal drives are somewhat impractical or economically infeasible. In turn, more practical drive configurations consist of a sequence of pulses, each of which causes a corresponding force to be imparted to the galvanometer or oscillator to make it move. Problematically, there is a notable drawback in the discontinuous nature by which forces are applied to the galvanometer or oscillator and asymmetric distortion of laser scanning motion can be introduced if left uncontrolled.

Since the mechanical properties of the constituent materials that compose the galvanometer or oscillator are influenced by temperature, and the damping of the motion is dependent on air density (in turn, a result of both temperature and pressure, where pressure varies with altitude, for instance), it is clear that ambient operating conditions affect the shape and magnitude of the linearity and misalignment of scan lines. In this regard, print quality changes occur as a result of changes in operating altitude, temperature or from large barometric changes, for example. While electronic measurement of temperature can be implemented with relatively simple and low cost components, measurement of pressure generally cannot, and introducing relatively high cost components to compensate for nonlinearity and misalignment would negate any prospective cost savings from using the galvanometer or oscillator.

Accordingly, there exists a need in the art for characterizing the manner in which bi-directionally scanning EP devices should operate according to various operating conditions, especially pressure. Particularly, there are needs by which knowing the actual operating conditions of the EP device will relate to making corrections to improve print quality. Ultimately, the need extends to simply and efficaciously obtaining pressure without introducing high-cost components. Naturally, any improvements should further contemplate good engineering practices, such as relative inexpensiveness, stability, low complexity, ease of implementation, etc.

SUMMARY OF THE INVENTION

The above-mentioned and other problems become solved by applying the principles and teachings associated with the hereinafter described obtaining pressure of operating environments of bi-directionally scanning electrophotographic (EP) devices, such as laser printers or copier machines, so that corrections can be implemented. In a most basic sense, an EP device is pre-characterized such that pressure is correlated to expected positional misalignment of scan lines. Based upon attainment of actual ambient operating conditions, the EP device under consideration is corrected to prevent or otherwise overcome the expected positional misalignment.

In this regard, an EP device includes a scanning mechanism in the form of a moving galvanometer or oscillator that reflects a laser beam to create scan lines of a latent image in opposite directions. A damping of the motion of the galvanometer or oscillator occurs per operating conditions, such as air density implicated by temperature and pressure (the pressure changes occurring especially from changes in altitude). To obtain pressure, a drive signal, such as a sequence of pulses, moves the galvanometer or oscillator at its resonant frequency. Based upon a parameter of the drive signal, such as pulse width, the ambient pressure can be made known. For instance, an EP device operated in a relatively high-pressure environment requires a relatively longer pulse width to drive the galvanometer or oscillator at its resonant frequency with a specified amplitude, whereas a shorter pulse width is required for a relatively low-pressure environment. In turn, the relationship can be mapped and stored. Corrections to improve print quality then occur according to the determined ambient pressure. Certain corrections include producing the latent image with a signal altered from an image data input signal.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, software, and/or other changes may be made without departing from the scope of the present invention. In accordance with the present invention, the obtaining of pressure of an operating environment of a bi-directionally scanning electrophotographic (EP) device, so that corrections per ambient pressure can be implemented, is hereafter described.

Figure 1:
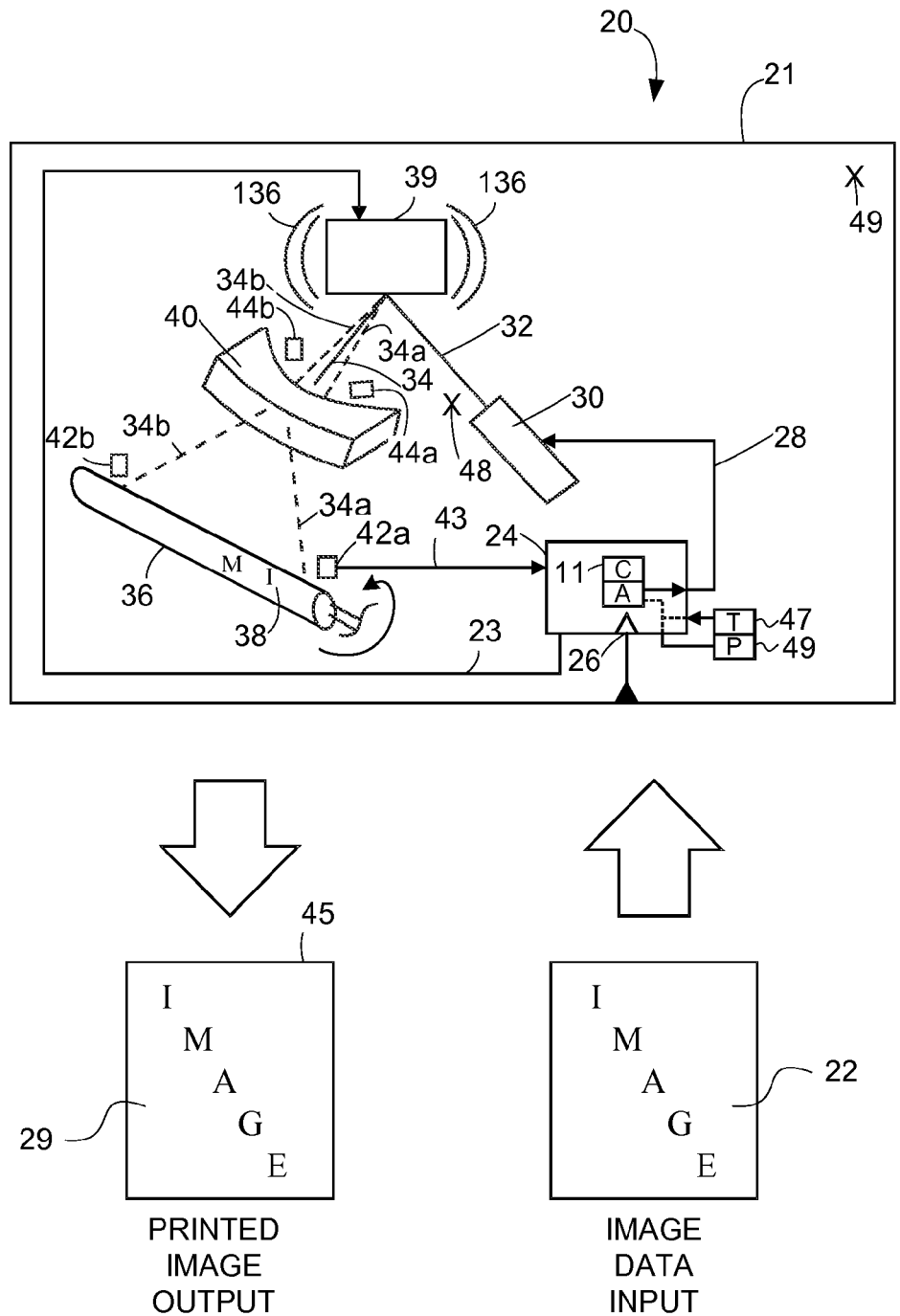
FIG. 1 is a diagrammatic view in accordance with the present invention of a representative bi-directionally scanning EP device.

With reference to FIG. 1, an EP device 20 of the invention representatively includes mono or color laser printers or copier machines. During use, image data 22 is supplied to the EP device from somewhere external, such as from an attendant computer, camera, scanner, PDA, laptop, etc. A controller 24 receives the image data at an input 26 and configures an appropriate output, video signal 28 to produce a latent image of the image data. In turn, a hard-copy printed image 29 of the image data is obtained from the latent image. If print alignment and operating conditions of the EP device are well calibrated, the printed image 29 corresponds nearly exactly with the image data input 22. If not, the printed image has poor quality, especially in the form of a variety of misalignments.

With more specificity, the output, video signal 28 energizes a laser 30 to produce a beam 32 directed at a scanning mechanism 39, such as a torsion oscillator or resonant galvanometer. As the oscillator or galvanometer moves (indicated by oscillation wave lines 136) the beam 32 is reflectively cast to create beam lines 34a, 34b on either side of a central position 34. As a result, multiple scan lines in alternate directions are formed on a photoconductor 36, such as a drum, and together represent a latent image 38 of the image data supplied to the controller. Optically, certain lenses, mirrors or other structures 40 exist intermediate to the photoconductor to transform the rotational scan of the laser beam reflected from the oscillator or galvanometer 39 into a substantially linear scan of the beam at the photoconductor 36, with substantially uniform linear scan velocity and with substantially uniform laser beam spot size along the imaging area of the drum. To provide common reference for the beam lines, various sensors are employed. Preferably, a forward sensor 42a and a reverse sensor 42b, called horizontal synchronization (hsync) sensors, are positioned near opposite ends of the photoconductor to provide a common reference for all forward scanning beam lines and all reverse scanning beam lines, respectively. In addition to, or in lieu of the sensors 42a, 42b, forward and reverse hsync sensors may be positioned at 44a and 44b, upstream of the representative optics 40. Alternatively still, a single hsync sensor might be used with one or more mirrors emplaced variously to act as a second hsync sensor. Regardless, the outputs of these sensors (representatively given as line 43 from hsync sensor 42a) are supplied to the controller 24 for referencing correct locations of the scan line(s) of the latent images. Downstream of the latent image, and not shown, the printed image is formed by applying toner to the latent image and transferring it to a media, such as a sheet of paper. Thereafter, the media 45 with the printed image 29 exits the EP device, where users handle it for a variety of reasons.

Unfortunately, the printed image 29 is not always an accurate representation of the image data input 22 and various operations are employed to tightly calibrate the EP device. In this regard, a temperature and pressure sensor 47 and 49 are provided to supply input to the controller to correct the EP device per ambient operating conditions, such as pressure and temperature. A controller function or algorithm A then uses the obtained pressure and temperature to implement a correction in the output, video signal 28 from the supplied image data input signal at 26. In placement, the sensors can typify any location internal or external to the EP device although both are shown generally nearby the controller, within a housing 21. However, a more likely position for the temperature sensor 47 is that of nearby the laser beam 30 at position 48, for instance, to better ascertain the temperature of the structures that actually form the scan lines of the latent image. As a corollary, a more likely position of the pressure sensor is that of relatively far away from any moving structures able to influence airflow, such as at position 49, so that pressure readings are not unduly influenced by fluctuating air. In form, the temperature sensor may representatively embody items such as a temperature sense resistor, a thermocouple, a thermistor, or any other detector influenced by thermal variations. Pressure sensors, on the other hand, may representatively embody items such as a diaphragm, a transducer, a capacitor, or any other detector influenced by pressure variations. To avoid relative cost, the pressure may be also inferred from other components of the EP device, as will be described in detail below, without need of taking direct pressure readings from sensor 49.

Figure 2A:
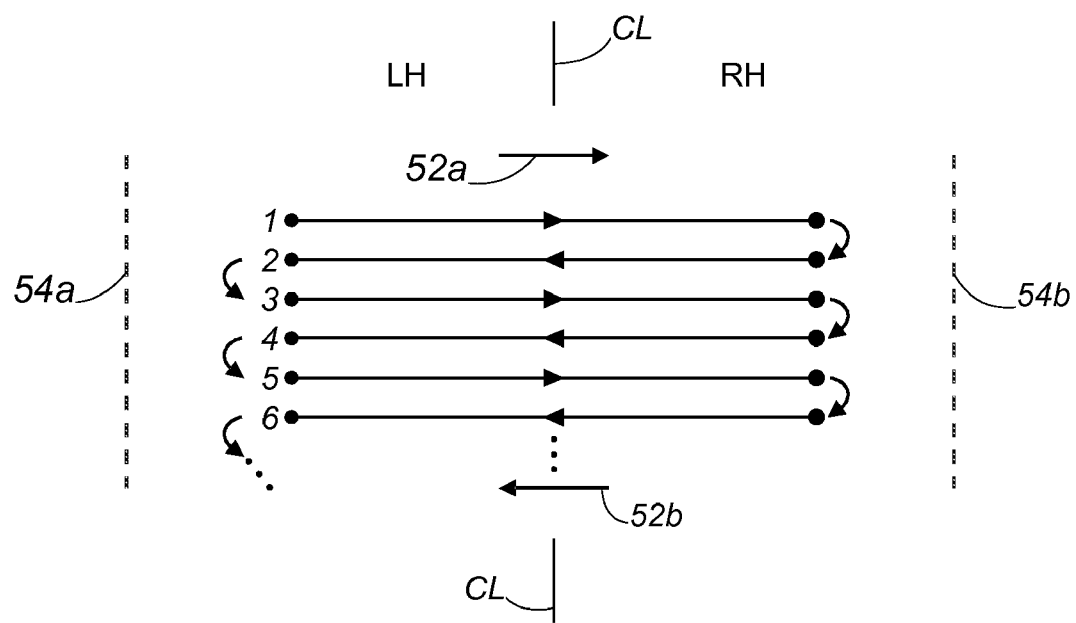
FIGS. 2A-2D are diagrammatic views in accordance with the present invention of desirable scan lines and reference positions in a bi-directionally scanning EP device and representative potential scan misalignments of same.

Before then, however, FIG. 2A conceptually shows the desired scan lines and reference positions in a bi-directionally scanning EP device and fairly suggests the nomenclature for use with later figures. Namely, a plurality of scan lines forming a latent image on a photoconductor, for example, are sequentially numbered 1-6, with odd numbered scan lines (1, 3, and 5) occurring in a forward scan direction 52a opposite the even numbered scan lines (2, 4, and 6) occurring in a reverse scan direction 52b. Also, the forward and reverse scan lines alternate with one another and such is the nature of scanning with the torsion oscillator or resonant galvanometer and its attendant formation of forward-scanning beam lines 34a and reverse-scanning beam lines 34b. Also, the reference position 54a supplies a common reference point for each of the forward scanning lines and is borne about by the signal from the forward hsync sensor. Conversely, the reference position 54b supplies a common reference point for each of the backward scanning lines and is borne about by the signal from the reverse hsync sensor.

Figure 2B:
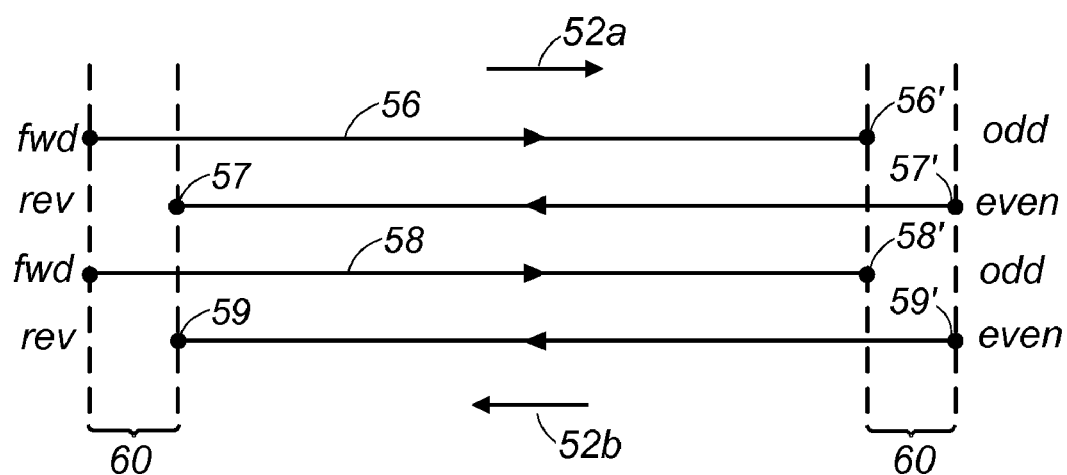
Figure 2C:
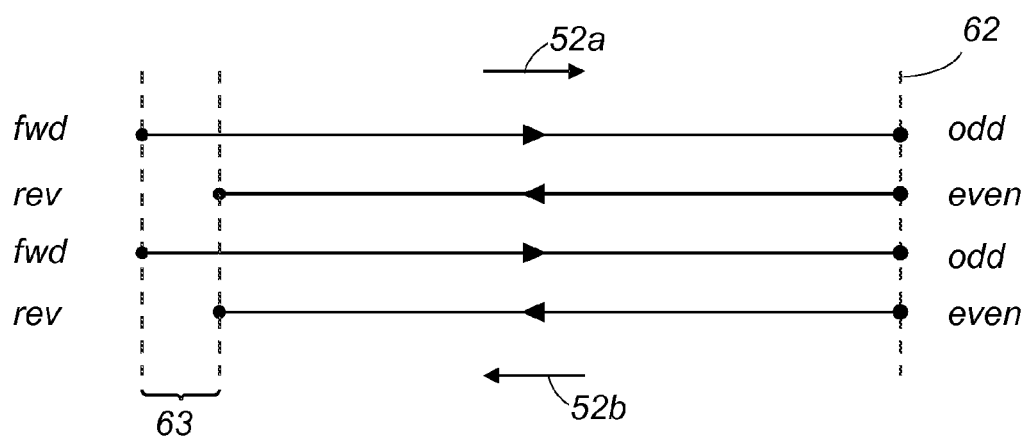
Figure 2D:
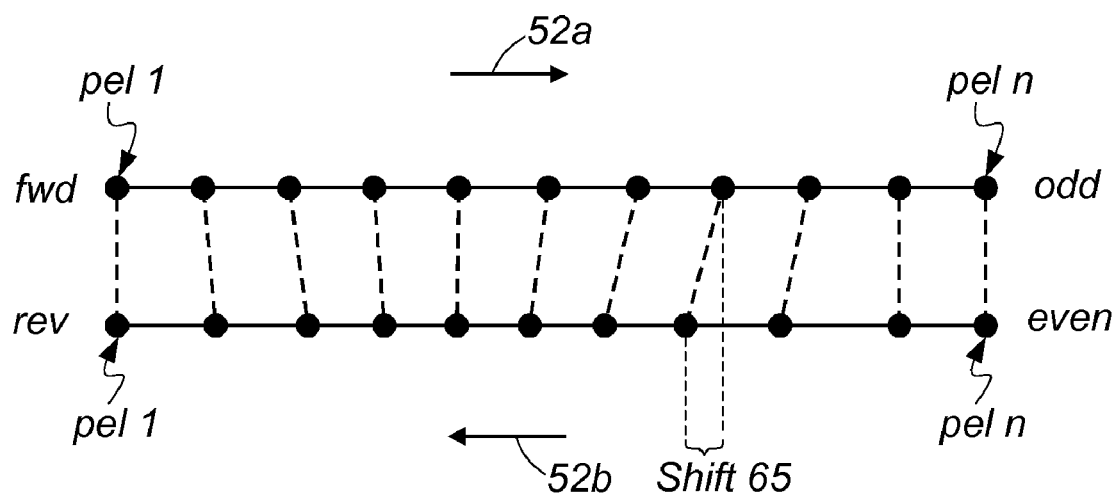

In FIGS. 2B-2D, the potential misalignments of bi-directional scans in an EP device may be classified into three basic categories. In the first (FIG. 2B), the end points 56', 58' of forward (fwd) scan lines 56, 58 do not coincide with the start points 57', 59' of reverse (rev) scan lines 57, 59 and is known herein as straight bi-directional misalignment. The scan lines are all also of relatively equal length thereby creating a nearly equal amount 60 of misplacement at each end of the scans. In the second (FIG. 2C), line length mismatch occurs. That is, the forward and backward scan lines are aligned on one side 62, but not on the other side where an amount 63 of mismatch occurs. In a typical embodiment, this is the result of forward and reverse scan lines having differing lengths. In the third (FIG. 2D), differential nonlinearity is observed. Namely, printed pels (pel #1-pel #n) within each forward or reverse scan are normally intended to be equally spaced apart. However, if there are differences in the linearity of pel placement between forward and reverse scans, there will be individual shifts 65 in the placement of sets of pels that occur in the same scan location among scans as shown. To the extent misalignment occurs in an actual bi-directionally scanning EP device, skilled artisans will appreciate that most misalignments take the form of some combination of more than one of the foregoing types. To this end, ambient operating conditions, especially pressure, are ascertained to help implement corrections.

Figure 3:
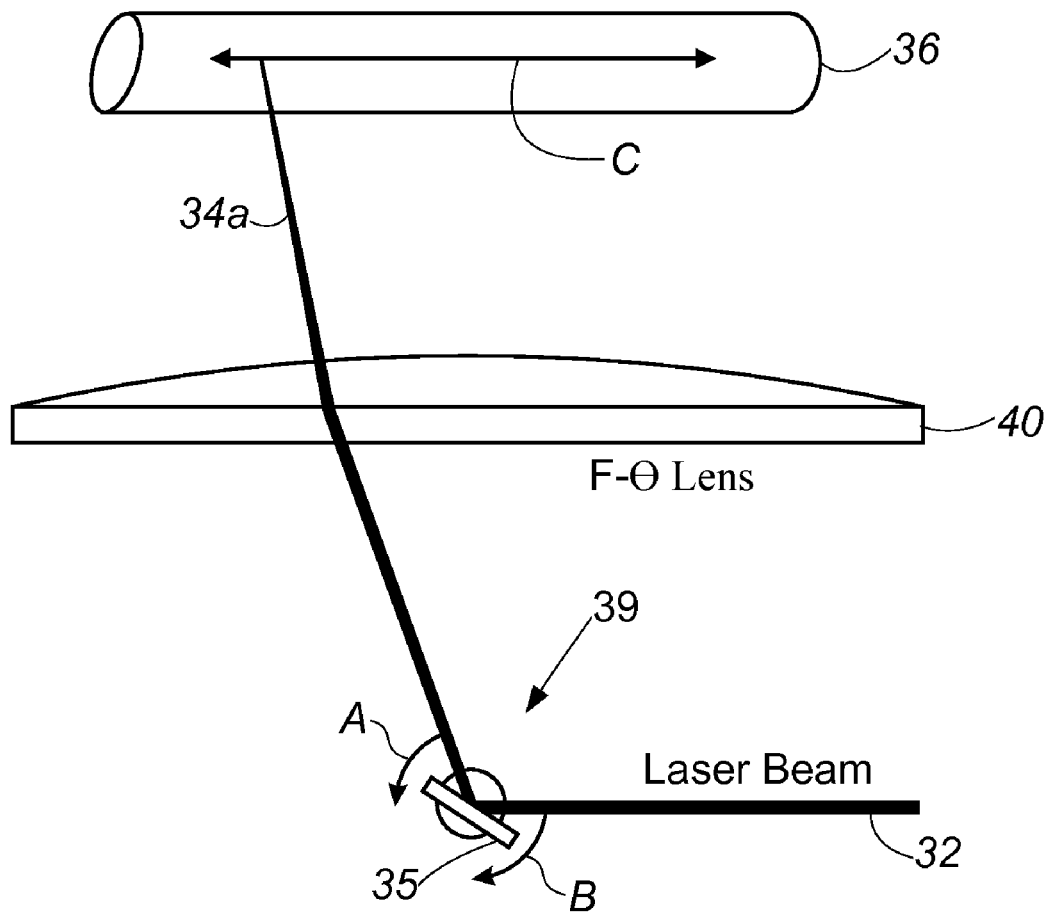
FIG. 3 is a diagrammatic view in accordance with the present invention of a more detailed version of a scanning mechanism of the EP device of FIG. 1.

With reference to FIG. 3, a slightly more detailed version of the scanning mechanism 39, such as a galvanometer or oscillator, of the EP device is shown. In this regard, the scanning mechanism includes a reflective surface 35, such as a mirror, that is caused to rotate about a central pivot point in either a first direction given by arrow A or in an opposite direction given by arrow B. The laser beam 32 upon hitting the reflective surface is then caused to impinge upon the photoconductor 36 to make scan lines of a latent image in opposite directions given by bi-directional arrow C. Also, drive means (not shown) exert a torque on the scanning mechanism to push it, so to speak, to rotate (in either the direction of arrow A or B). In this regard, the torque occurs for a relatively short period of time, but adds a sufficient amount of energy to the system of the scanning mechanism so that correct scan amplitude is maintained for at least both a right half of a forward scan and a right half of a scan in the reverse. Thereafter, upon the scanning mechanism reaching a corresponding mid-point or centerline of its scan line, the scanning mechanism is similarly pushed (now in the opposite direction of either arrow A or B) to complete the left half of the reverse scan line, followed by the left half of the forward scan line. Over time, the process repeats and multiple scan lines are produced. By analogy, the scanning mechanism is akin to a pendulum that gets pushed in both a forward and reverse direction. By operation of gravity and other forces, the pendulum reverses direction on its own as it transitions from the forward to the reverse directions at the apex. To keep the pendulum swinging with a desired amplitude, pushes are occasionally given. Diagrammatically, the halves of the scan lines are seen in FIG. 2 according to the right half RH and left half LH appearing on opposite sides of a centerline CL. It is also the case that the highest drive efficiency is achieved when the frequency of the push of the scanning mechanism (or pendulum, by analogy) coincides with the resonant frequency of the scanning mechanism.

Figure 4:
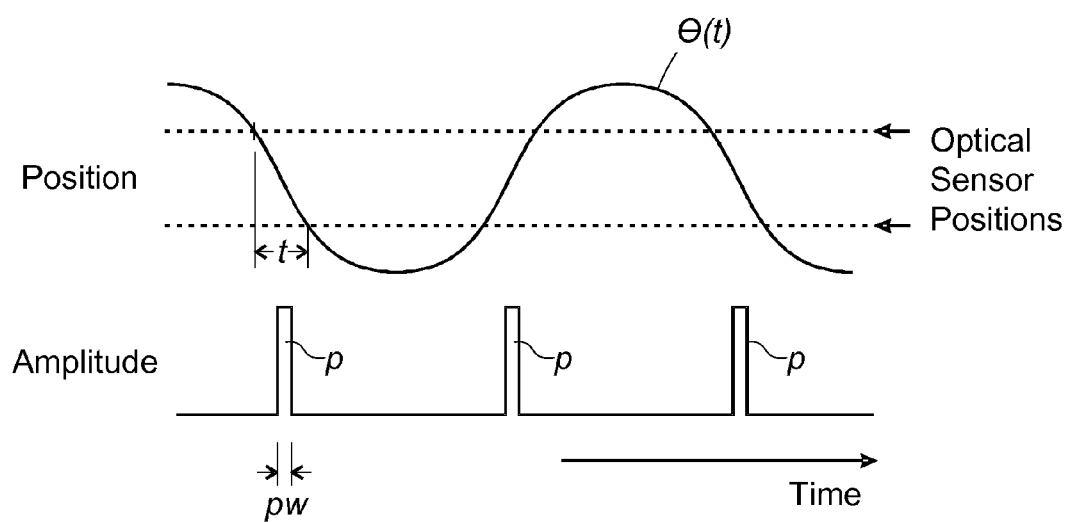
FIG. 4 is a graph in accordance with the present invention of angular scan position and pulsed drive signals for the scanning mechanism.

With reference to FIG. 4, assuming that the optics are designed to appropriately transform the nonlinear angular motion of the laser beam reflected from the mechanism into linear motion of the laser spot on a photoconductor, the ideal motion of the mechanism driven by an appropriate electronic driver is described by the sinusoidal equation:

$$\theta(t) = A \cdot \sin(\omega \cdot t) \quad \text{Equation 1;}$$

where $\theta(t)$ is the instantaneous angular position of the mechanism, with $\theta=0$ occurring at the centerline (CL, FIG. 2) of the scan, A being the maximum excursion of the beam, $\omega$ being the radian frequency of the motion, and t being the time. Akin to the pendulum analogy, the driver controls the amplitude and frequency of the motion, but the most efficient operation occurs if the scanning mechanism is driven or pushed at or near its natural resonance point. While the actual motion of the laser spot is affected by several factors, including for example, (1) the drive method and configuration of the scanning mechanism, (2) nonlinear damping of the scanning mechanism, (3) misalignment of the scanning mechanism, and (4) nonlinearity of various optics in the EP device (such as element 40), near-ideal motion can be obtained if the drive mechanism could, indeed, follow the $\theta(t)$ curve. As before, however, design constraints generally make such impractical or economically unfavorable.

Thus, the more practical drive approach is shown via a sequence of pulses P, each of which causes a corresponding force to be imparted to the scanning mechanism to make it resonate at its resonant frequency. Such also occurs by imparting an electromagnetic, electrostatic or other force and coupling it to the scanning mechanism via an appropriately positioned electromagnetic, electrostatic, or other coupling receiver (not shown). While the amplitude of the pulses is fixed, the duration pw of each pulse can be dynamically varied to maintain consistent scan times as measured by optical sensors, (e.g., hsync sensors) according to the shown time t, which intercept the scanning laser beam on either end of the scan lines. In general, the greater the air resistance in the operating environment, the wider or longer the pulse width that is required. Conversely, the lesser the air resistance in the operating environment, the shorter the pulse width that is required. Regardless, both the lengthening and shortening of the pulse width occurs via a feedback drive scheme. This drive scheme is also particularly well suited to a controller 24 of FIG. 2 contemplative of a digital control system in which a digital controller (e.g. microcontroller, microprocessor, DSP, ASIC, or FPGA) is designed to provide pulses of precise duration and timing to the scanning mechanism, such as along control line 23, and to accurately measure the timing of feedback signals, e.g., line 43, from the sensors. Also, while measuring the difference between the times that the laser beam strikes a first sensor at one end of the photoconductor to the time that it strikes a second sensor at the opposite end, the controller can maintain a constant laser beam transit time across the printing area by varying the width of each of the drive pulses. A procedure can then be used to locate the precise resonance frequency by stepping through a range of frequencies and determining which frequency results in the narrowest or shortest pulse widths.

In other words, under normal resonant operation of a scanning mechanism, the width of the pulses required to properly drive the mechanism will vary as a function of the device efficiency and environmental factors, including temperature and pressure. For example, as air pressure decreases as a result of changes in altitude, the density of the air will decrease, and therefore the amount of damping presented to the mechanism will likewise decrease as a result of reduced air resistance. It will therefore require less energy, and correspondingly shorter drive pulses to maintain the same scan transit time.

In this regard, a variable ("PI_Total") can be defined to represent the instantaneous strength of the drive signal. Namely, this variable is defined as the difference between the current width of the pulse (pw), in the actual operating environment to resonate the scanning mechanism at the required amplitude, and some nominal pulse width value. In turn, the nominal value is specific to a particular EP device and is determined by measuring the pulse width necessary to resonate the scanning mechanism under a standard set of operating conditions, or it may be representative of a particular EP device design, determined either theoretically or through collection and processing of data on a statistical sample of units, or both. Relative to operating conditions, the ambient air pressure is related to the variable PI_Total, since the strength of the drive signal (e.g., pulse train) is directly dependent upon the amount of damping presented to the device, which is in turn dependent upon air pressure. As in FIG. 12, described below, this relationship is evident in both theoretical and empirical modeling.

Figure 5:
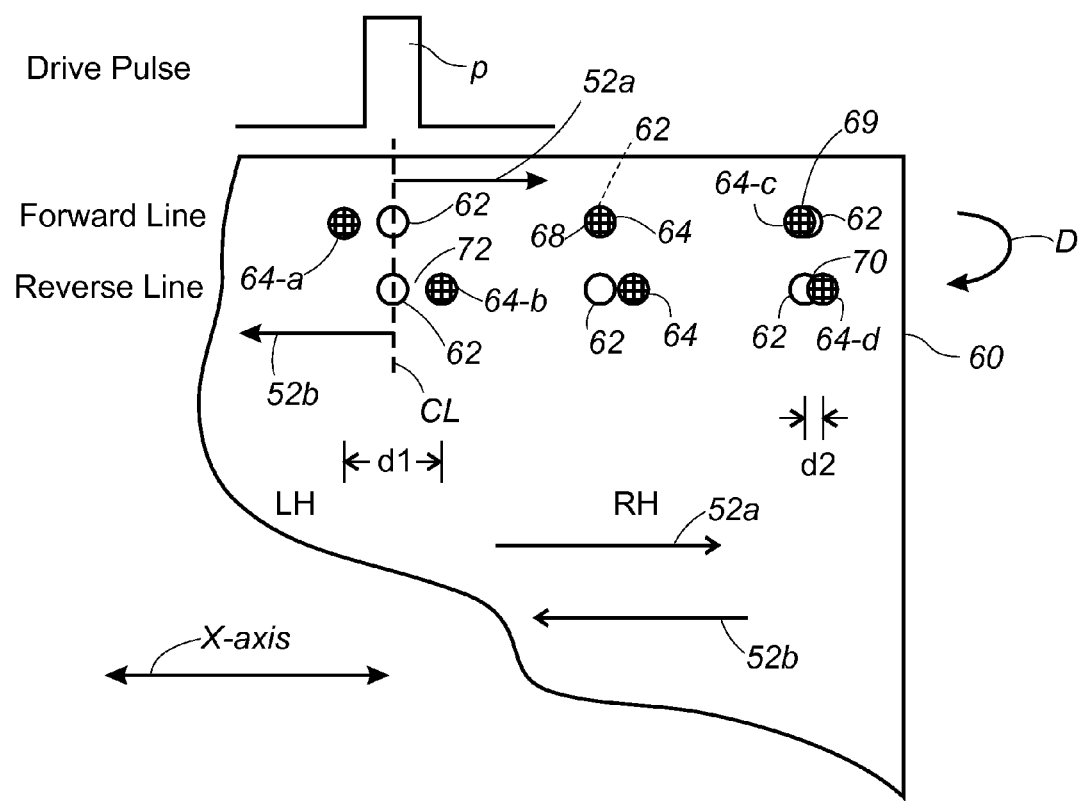
FIG. 5 is a diagrammatic view in accordance with the present invention of a representative distortion of a laser spot potentially occurring in the EP device of FIG. 1.

With reference to FIG. 5, a drive pulse P for pushing a scanning mechanism is shown relative to how desired and undesired pixels (pels) occur on adjacent forward and reverse scan lines in a portion of the printing area 60. White circles 62 indicate ideal or desired pel locations, while solid or darkened circles 64 indicate actually printed pel locations. During use, when the drive pulse P is applied, there is a small deviation from the ideal scan. Damping caused primarily by air resistance slows the scanning mechanism as it moves through one half cycle (e.g., a right half RH of the printing area 60 relative to the centerline CL), which in turn causes successive pels to lag (alternatively, lead—not shown) in the direction of travel, resulting in print nonlinearity. The amount of deviation between the ideal and actual pel locations, e.g., circles 62 compared to circles 64, respectively, increases over time as the effect of the applied force is damped. For instance, as the scanning mechanism creates a scan line in the forward direction toward the right half RH of the printing area 60 relative to the centerline CL, the darkened circle 64 and the underlying white circle 62 align and register fairly well at a position 68 near the centerline. As travel of the scan line progresses, however, the alignment and registration of the white and darkened circles varies, such as at position 69, such that the ideal and the actual pels do not align perfectly. Continuing, the scan line reverses course from a forward direction 52a to a reverse direction 52b, according to the representative arrow D, and alignment and registration of the ideal and actual pels separates even further, such as at position 70. Ultimately, the mismatch between the ideal and actual is greatest near the centerline CL, such as near position 72, before scanning in the reverse direction occurs in the direction 52b for the left half LH of the printing area 60. As is then seen, the resulting linearity error varies across the scan lines, with the maximum error occurring at or near the centerline CL position at which the drive pulses occur. Moreover, non-linearity produced in reverse scan lines is opposite in direction to that produced in forward scan lines, and therefore, a misalignment between pels on adjacent scan lines will occur with a maximum alignment error of double the linearity error.

Figure 6A:
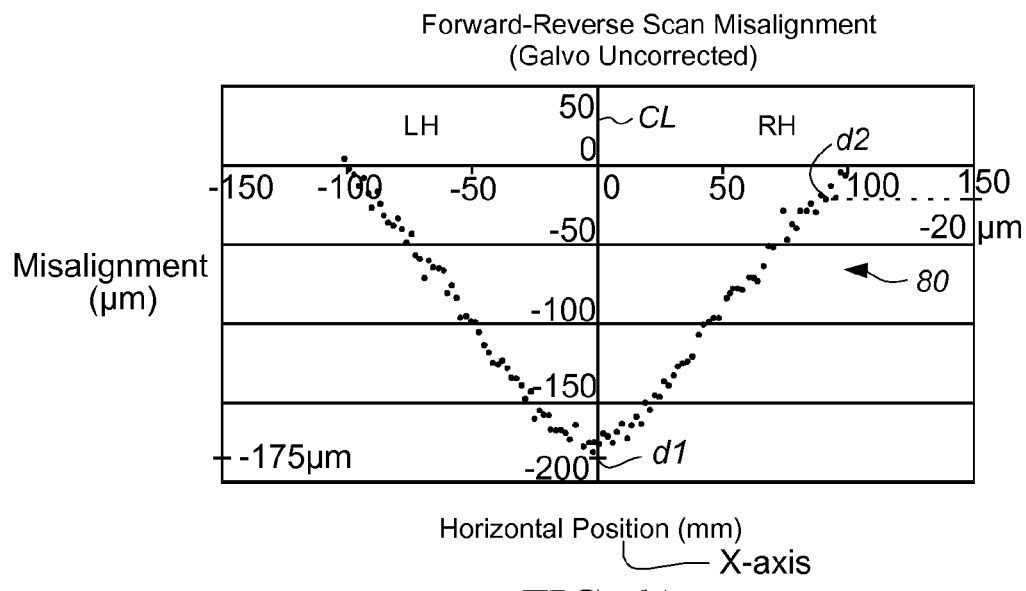
FIGS. 6A and 6B are graphs in accordance with the present invention of empirical and theoretic misalignment data representative of potential misalignments in a bi-directionally scanning EP device.
Figure 6B:
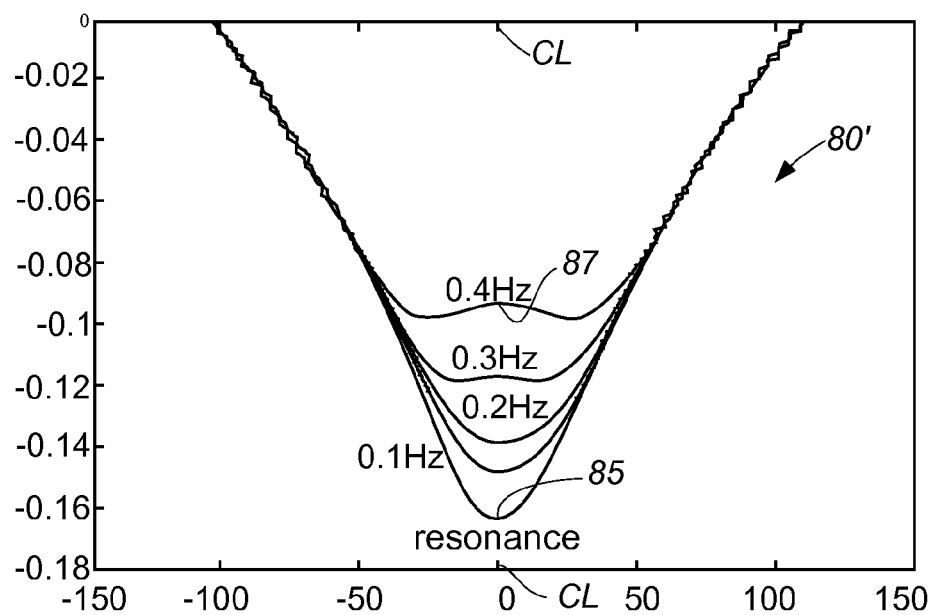

Plotting this out, FIGS. 6A and 6B show empirical and theoretical results, respectively, resembling a "V" shaped curve 80 and 80'. In FIG. 6A, numerous sample points were obtained in creating curve 80 for an EP device and skilled artisans will observe that the closer the scan line is to the centerline, the worse the misalignment between the ideal and the actual pel locations. Because only actual pels can be measured relative to other pels, and not ideal pels relative to actual pels, the graph more precisely represents distances of misalignment relative to adjacent pels, and adjacent pels in adjacent scan lines (forward versus reverse scan line, and vice versa). Correlating back to FIG. 5, a distance d1 exists of about 175 microns between adjacent darkened circles 64-a and 64-b near the centerline CL. Further away from the centerline CL, however, the distance between pels is much closer together. In other words, the misalignment is less at distance d2 between adjacent darkened circles 64-c and 64-d compared to distance d1. Skilled artisans will also note that the horizontal position on the graph (x-axis) extends to about +/−100 mm in length. By converting to inches, a media of about 8.5 inches wide by 11 inches long has about +/−108 mm per each left and right half LH, RH of the 8.5 inches relative to centerline and a few millimetres per the 8.5 inch-wide media is unused. That is, about 8 mm per each of the left and right halves of the media are not printed on and, thus, has no misalignment and the empirical data only covers the +/−100 mm.

In FIG. 6B, it is shown that the theoretical curve 80' of misalignment corroborates the empirical curve 80 of misalignment, with the greatest amount of misalignment occurring near the centerline. It also indicates that a scanning mechanism exhibits somewhat distorted misalignment near the centerline, at position 85 for instance, from a pulse train whose frequency does not match the resonant frequency of the scanning mechanism, thereby creating a phase shift between the drive pulse train and the scanning motion of the scanning mechanism.

Figure 7:
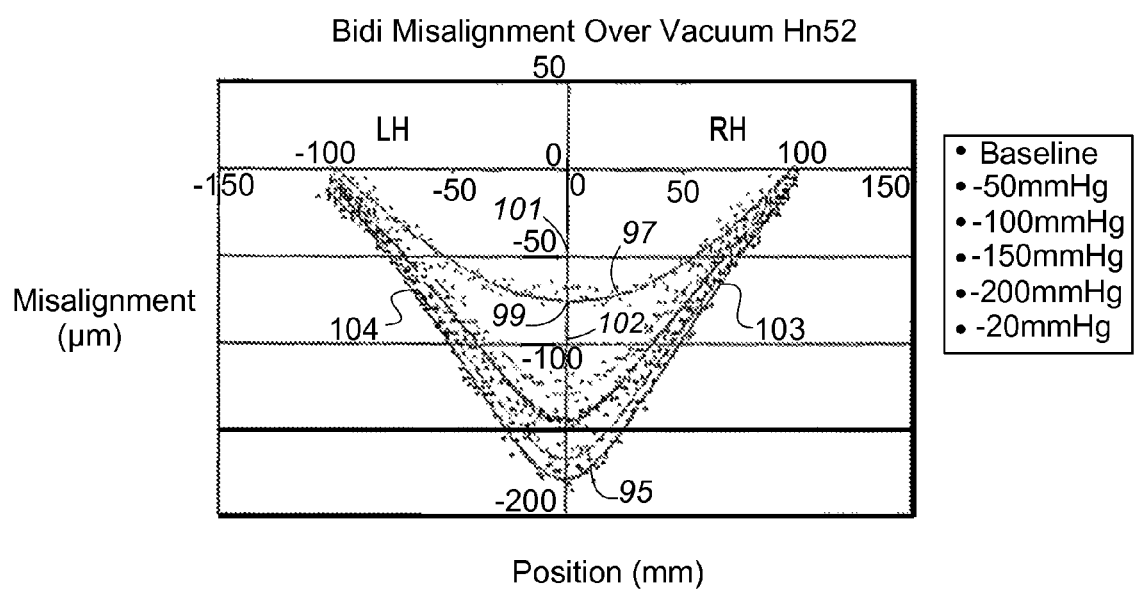
FIG. 7 is a graph in accordance with the present invention of empirical misalignment as a function of various pressures.

With reference to FIG. 7, a plurality of superimposed curves are given showing empirical or measured misalignment profiles changed as a function of relative air pressure reduction, which certainly occurs as a result of changes in altitude of the operating environment. In this regard, a baseline plot 95 is given for a standard operating pressure, such as at 29.92 inches of mercury (Hg). Thereafter, the plots are given relative to the baseline in millimeters of mercury (Hg). As is apparent, the misalignment improves with lower pressure, or at higher altitude, such is given by plot 97. Correspondingly, the steepness of the V-shaped profile will flatten-out or "steepen-up" as will the legs 103, 104 of the profile have a variable amount of slope, as will be better defined below. Relative to temperature changes, the V-shaped plots would either rise or lower from, for example, having an apex 99 to either having an apex at position 101 or having an apex at 102, respectively, as temperature increased or decreased, respectively.

Figure 8:
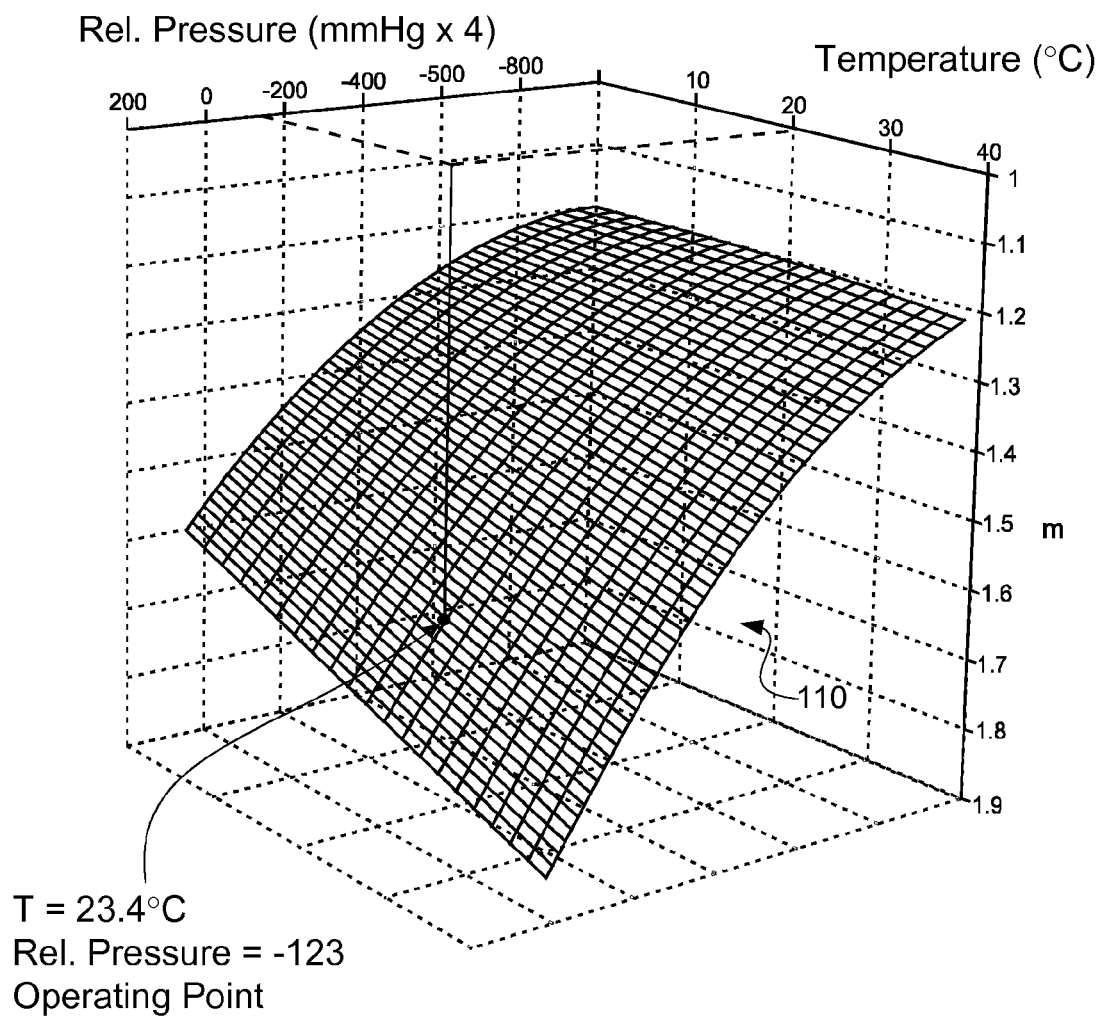
FIG. 8 is a surface plot in accordance with the present invention of a representative model pre-characterizing an EP device according to pressure and temperature.

Accordingly, the inventors have empirically and theoretically shown that misalignment gets better or worse according to various pressures and temperatures of an operating environment in which a mechanical structure of a bi-directionally scanning EP device is operated to create scan lines. With reference to FIG. 8, modeling or pre-characterizing this results in a set of surface plots, such as 110, giving parameters to a function describing the amount of error at each position on the page. Alternatively, the model could be expressed in forms such as functional, tabular, or algorithmic data, or a combination thereof so long as relationships between the measured or obtained independent variables (scan position, temperature, and pressure) and a dependent variable of interest (forward-reverse alignment error or linearity error) are known. Moreover, the model may be based on empirical measured data, on theoretical physical principles, or on a combination thereof.

As a working example of the model, consider the operating point shown. If it was ascertained that the temperature of the EP device was 23.4 degrees Celsius, and the pressure (relative to some baseline, as before) was −123, a slope amount m of about 1.6 could be ascertained. Relative to other models (not shown, but plotted representatively the same), a temperature and pressure entry point would also reveal a corresponding parameter of b (y-intercept of the V-shaped curve) and an "a" value corresponding to how sharp a transition the V-shaped curve makes (a high "a" value is a very pointy V-shape whereas a low "a" value is a more rounded V-shape at the apex).

In turn, plugging the obtained or ascertained variables (m, b and a) into an equation defining the V-shaped curves of FIGS. 6A and 6B, for instance, the amount of misalignment in a bi-directionally scanning EP device can be known. Representatively, the following equation has been observed to fairly well define the V-shape of the data and plugging the obtained variables (m, b and a) into it reveals a fair approximation of the amount of misalignment in an EP device.

$$y(x) = [((2^{(ax)} - 1)mx)/(2^{(ax)} + 1)) + b]$$ Equation 2;

where x is the relative horizontal position, e.g., the x-axis as previously shown. In turn, knowing the amount of misalignment per an operating condition of the EP device, such as pressure or temperature, a skilled artisan can enter a correction to compensate for the misalignment in advance of the misalignment actually occurring in a printed image. Skilled artisans will also know how to correlate or convert the amount of misalignment (e.g., a first distance) to: 1) image data input, especially in the form of pixels (pels) of a fixed length (e.g., a second distance), such as 600 or 1200 dots per inch (dpi); or 2) pulse widths pw, so that the pixel information for scanning a latent image on a photoconductor is readily also known according to pressure and/or temperature (and a correction readily implemented).

Figure 9:
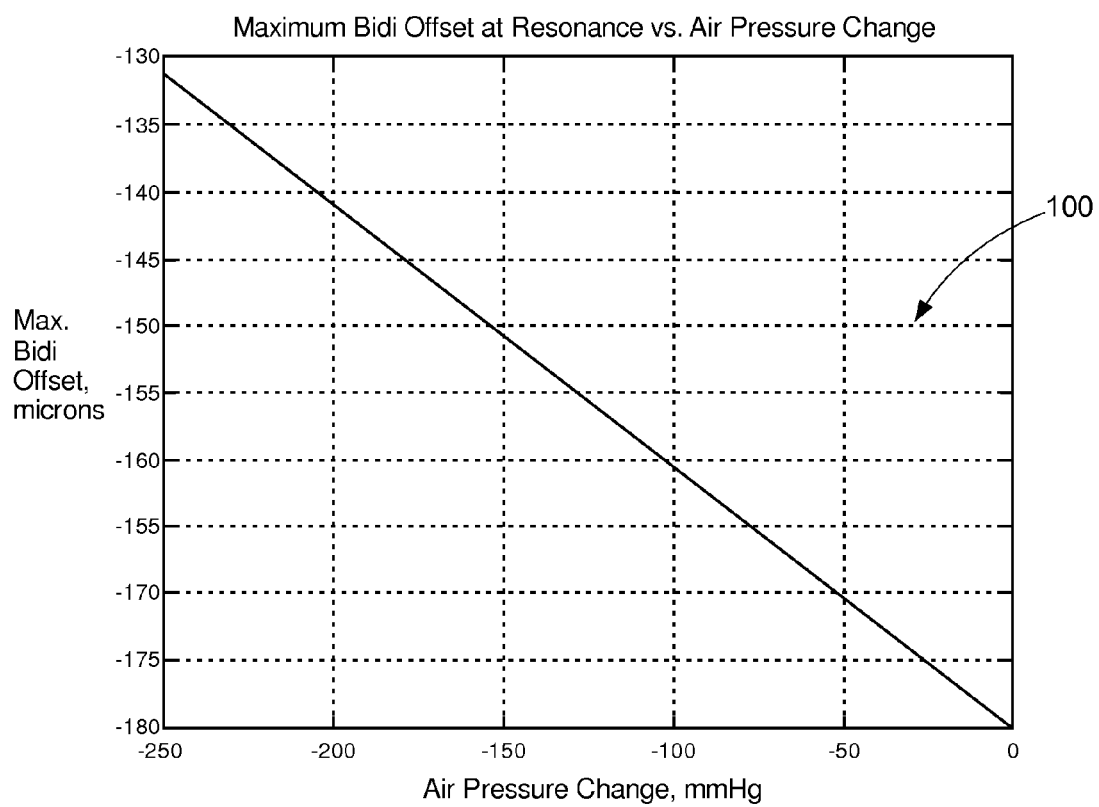
FIG. 9 is a graph in accordance with the present invention of maximum misalignment as a function of pressure change relative to a base pressure.
Figure 10:
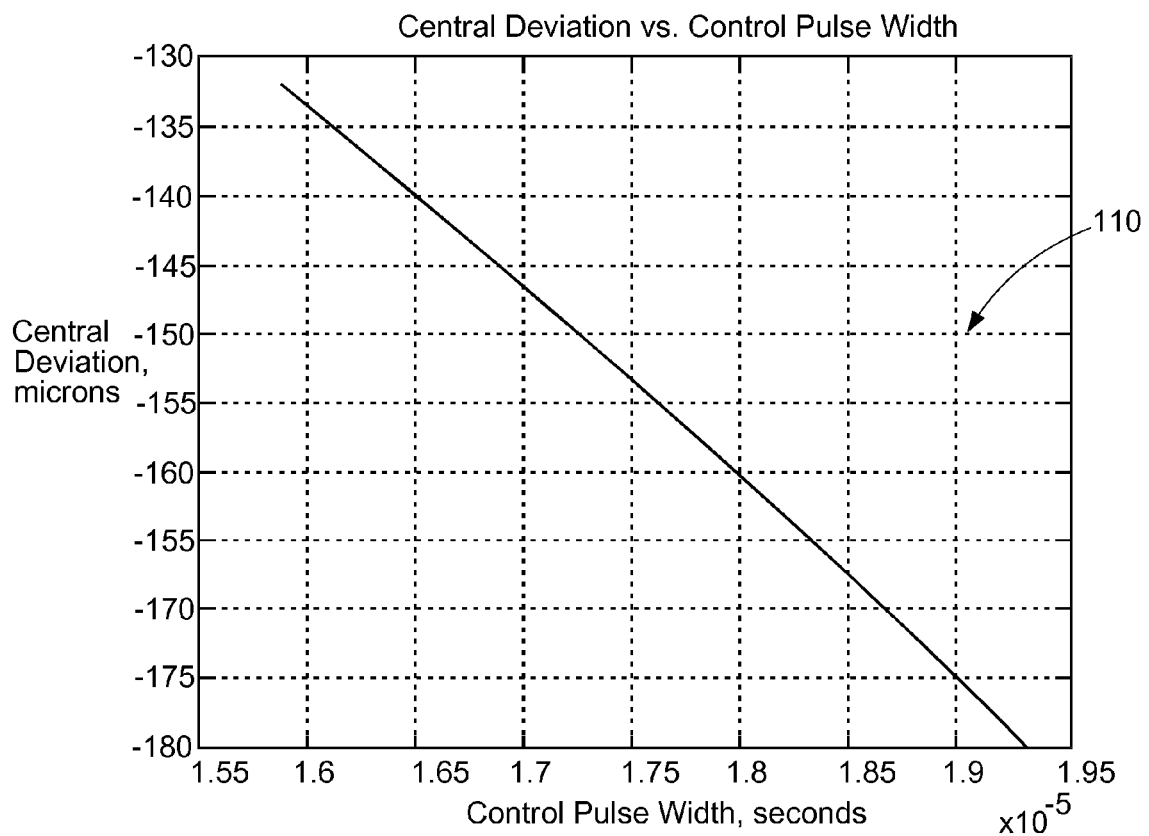
FIG. 10 is a graph in accordance with the present invention of maximum misalignment as a function of pulse width for driving a scanning mechanism at resonance.
Figure 11:
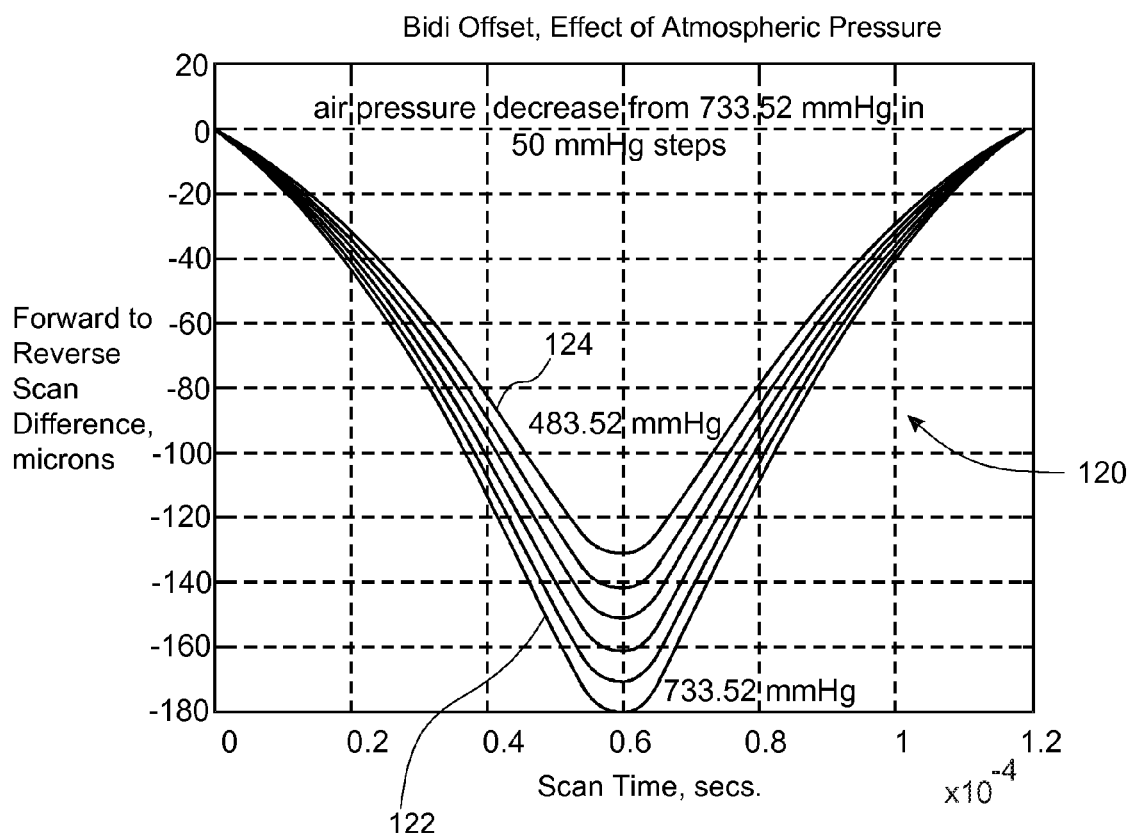
FIG. 11 is a graph in accordance with the present invention of misalignment as a function of time for scanning.

For instance, FIG. 9 shows a curve 100 correlating the amount of maximum offset (e.g., the apex of the V-shaped curve) relative to air pressure. In that pressure is again relative to a baseline pressure, e.g., the 0 point, the other pressures are given as negative numbers in millimeters of mercury. In FIG. 10, curve 110 shows this same amount of maximum offset (alternatively stated as a central deviation) relative to the pulse width of one or more pulses of a pulse train to drive the scanning mechanism at resonance. In FIG. 11, a curve 120 representatively shows a forward to reverse scan line offset relative to scan times. It also superimposes various pressures with the bottom curve 122 being the baseline pressure with the top curve 124 being the lowest pressure.

Figure 12:
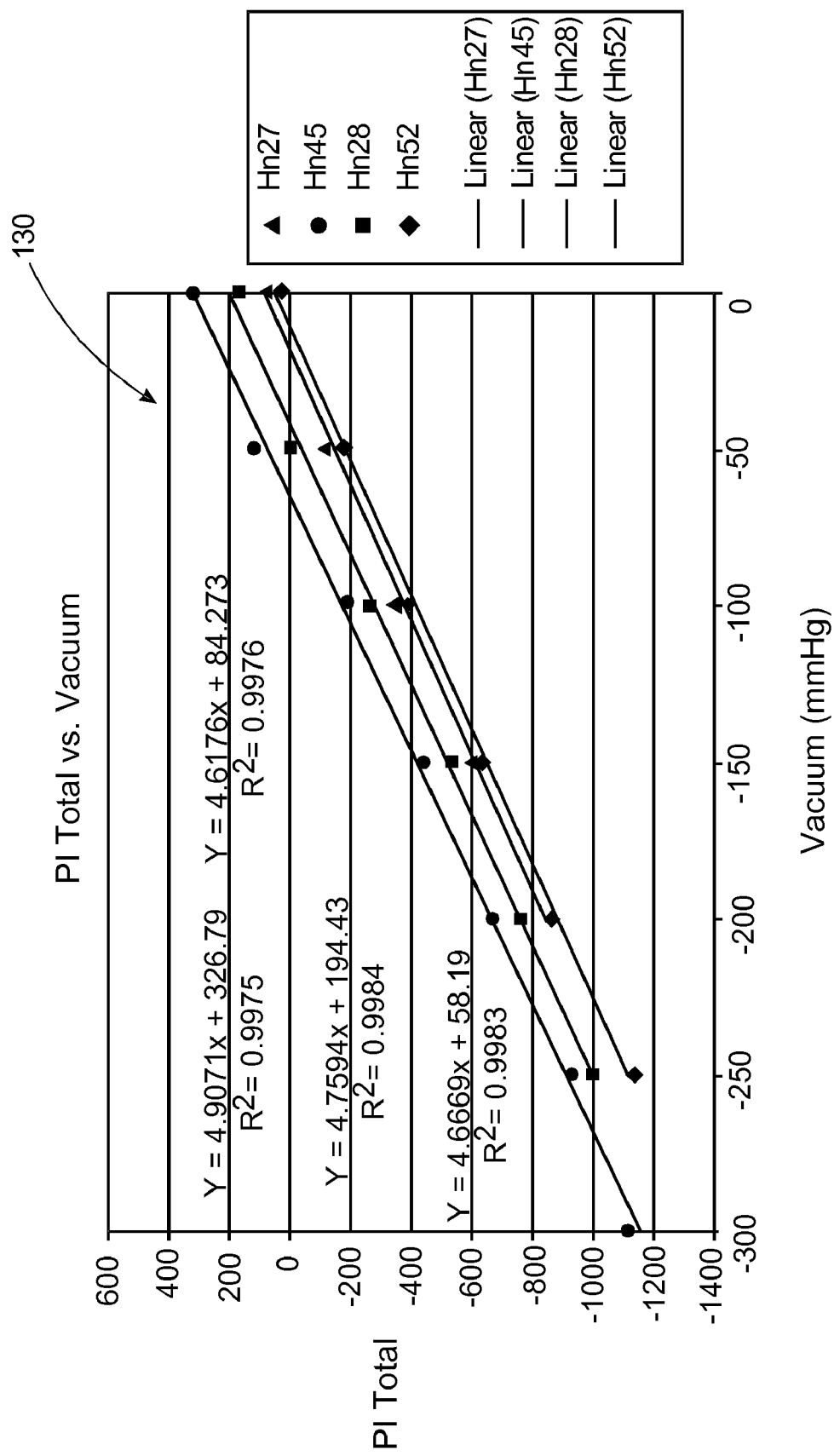
FIG. 12 is a graph in accordance with the present invention of a drive parameter for driving a scanning mechanism at resonance as a function of pressure change relative to a base pressure.

Lastly, FIG. 12 shows the previously discussed PI_Total relative to pressure as pluralities of curves 130 empirically measured for plurality of individual EP devices, such as those with names or identifiers Hn 27, 28, 45 and 52. As is apparent, each is a straight line. It is also the situation that PI_Total equals the pulse width pw of a presently measured pulse of a train of pulses (e.g., FIG. 4) to resonate the scanning mechanism under ambient operating conditions minus a pulse width of a nominal pulse, as before. Thus, by rearranging the PI_Total equation, a pulse width pw of a presently measured pulse of a train of pulses to resonate the scanning mechanism under ambient operating conditions is known directly relative to pressure (or the vacuum axis in millimeters of mercury as shown). As a result, pressure need not be actually measured in an EP device and can be obtained by simply knowing the actual pulse width pw necessary to drive a scanning mechanism at resonant frequency under ambient operating conditions. In this manner, expensive pressure sensor components in manufacturing an EP device, for instance, can be avoided. Pressure can also be updated whenever desired simply by having the controller or other function ascertain the pulse width of the pulses required to drive the scanning mechanism at its resonant frequency at an appropriate amplitude. In other words, a real time pressure sensor is made available. Naturally, alternate embodiments contemplate ascertaining other parameters of a drive signal of a scanning mechanism at resonance, other than just a pulse width of a pulse train.

One of ordinary skill in the art will recognize that additional embodiments of the invention are also possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. A device, comprising:
   a bi-directionally moving scanning mechanism for creating a plurality of scan lines in opposite directions to create a latent image; and
   a controller for signaling movement of the scanning mechanism with a pulse, the controller further including:
      a first function for determining a width of the pulse upon the scanning mechanism resonating at a resonant frequency,
      a second function for correlating the determined width of the pulse to an ambient pressure in which the scanning mechanism is operating, and
      a third function for implementing a scan alignment correction based upon the correlated ambient pressure without affecting the ambient pressure of the device.

2. The device of claim 1, wherein the third function implements a correction to the scan lines of the latent image based upon the correlated ambient pressure.

3. The device of claim 2, wherein the second function compares the pulse width to a nominal pulse width.

4. The device of claim 2, wherein the controller further includes a fifth function that correlates a time of the scan lines with misalignment.

5. A method, comprising:

creating, using a bi-directionally moving scanning mechanism, a plurality of scan lines in opposite directions for creating a latent image;

signaling movement of the scanning mechanism with a pulse, and determining a width of the pulse upon the scanning mechanism resonating at a resonant frequency;

correlating the width of the pulse to an ambient pressure in which the scanning mechanism operates; and implementing a correction to the scan lines of the latent image based upon the correlated ambient pressure without affecting the ambient pressure.

6. The method of claim 5, wherein the correlating comprises comparing the pulse width to a nominal pulse width.

7. The method of claim 5, wherein the correlating comprises correlating a time of the scan lines with misalignment.

8. The method of claim 5, wherein the signaling and determining are performed by a processing member.

* * * * *